D. S. WELCHMAN.
HEN'S NEST.
APPLICATION FILED DEC. 9, 1912.
1,141,438.
Patented June 1, 1915.
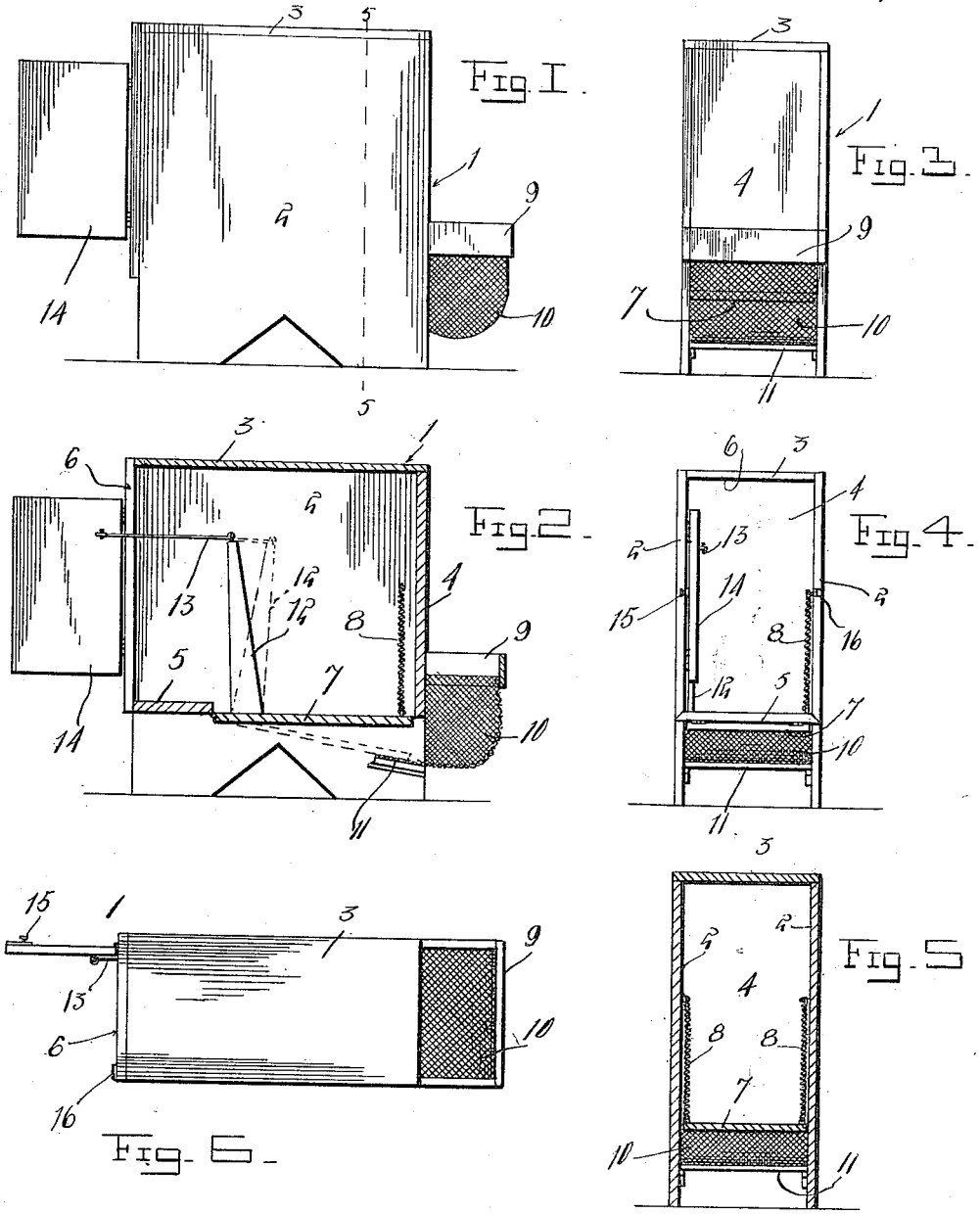
Inventor
D. S. Welchman.

UNITED STATES PATENT OFFICE.

DAVID S. WELCHMAN, OF GROVER, WYOMING.

HEN'S NEST.

1,141,438.  Specification of Letters Patent.  Patented June 1, 1915.

Application filed December 9, 1912. Serial No. 735,709.

*To all whom it may concern:*

Be it known that I, DAVID S. WELCHMAN, a citizen of the United States, residing at Grover, in the county of Uinta, State of Wyoming, have invented certain new and useful Improvements in Hens' Nests; and I do hereby declare the following to be a full, clear, and exact description of the invention, such as will enable others skilled in the art to which it appertains to make and use the same.

The present invention is directed to improvements in hens' nests and has for its object to so construct a device of this character that the newly laid eggs will safely pass from the nest to a receptacle.

A further object of the invention is to so construct the same that the fowl in entering the same will close the door to prevent other hens from entering the nest.

With these and other objects in view, this invention resides in the novel features of construction, formation, combinations and arrangements of parts to be hereinafter more fully described, claimed and illustrated in the accompanying drawing, in which:—

Figure 1 is a side elevation of the nest. Fig. 2 is a longitudinal sectional view through the same. Fig. 3 is a rear view. Fig. 4 is a front elevation. Fig. 5 is a sectional view on line 5—5 of Fig. 1. Fig. 6 is a top plan view.

Referring to the drawing, the numeral 1 designates a box which is preferably rectangular in cross section and consists of a pair of sides 2, top 3, end 4 and a narrow bottom 5, said box having the open end 6.

The sides 2 of the box extend a short distance below the narrow bottom 5 so that the box 1 will be supported slightly above the floor to prevent dampness and vermin from entering the same.

Hingedly connected at one end to the narrow bottom 5 is a platform 7, the same being suspended at its outer end by coil springs 8 which have their lower ends connected to the platform and their upper ends to the sides 2, said springs serving to hold the platform 7 in a horizontal position when the nest is unoccupied.

Secured to the end 4 is a frame 9 which serves to support the upper edges of a wire mesh receptacle 10, the lower edge of which is secured to a bar 11 which is arranged between the sides 2 and below the plane of the narrow bottom 5, said bar serving to limit the downward swinging movement of the platform 7.

Rising from the platform 7 and adjacent the hinged end thereof is an arm 12 to the upper end of which is pivotally connected a link 13, the other end of said link being similarly connected to a hinged door 14 which is adapted to partially close the open end 6 of the nest when the fowl is upon the platform 7.

From this construction it will be seen that when a hen enters the nest through the open end 6 and passes upon the platform 7, the same will be rocked until the outer end thereof rests upon the bar 11, thus positioning the platform at an inclination that the dropped egg will roll into the receptacle 10. As soon as the hen passes the platform 7 the same during this rocking movement will swing the arm 12 inwardly and through the medium of the link 13 the door 14 will partially close the open end of the nest to prevent other hens from entering the nest when it is occupied. When the hen leaves the platform 7 and steps upon the bottom 5, said platform will return to its horizontal position and the forward movement of the arm 12 will swing the door open, thus permitting the hen to leave the nest.

If desired the sliding latch 15 may be attached to the door 14 for engaging the keeper 16 secured to one of the edges of the sides 2 so that the door will be automatically locked when the hen enters the nest so that should the hen entering the nest lay an egg the same can be separated from those that do not lay.

What is claimed is:—

A hen's nest comprising a box having an open end and a closed end, a floor internally of the box adjacent to the door, a platform hingedly connected to the floor, springs attached to the walls of the box supporting the opposite end of said platform, an arm rising from the platform adjacent to its hinged connection with the floor, a link connecting the upper end of the arm and the door, a frame secured to and extending from the closed end of the box, a bar limiting the downward movement of the platform supported by the sides of the box below the frame, a receptacle supported by said frame and said bar, said platform being rocked by the weight of a fowl, thereby rocking the arm and closing the door.

In testimony whereof, I affix my signature, in presence of two witnesses.

DAVID S. WELCHMAN.

Witnesses:
MARTIN L. BEE,
MARY F. WELCHMAN.

Copies of this patent may be obtained for five cents each, by addressing the "Commissioner of Patents, Washington, D. C."